(12) United States Patent
Rost et al.

(10) Patent No.: US 6,368,445 B2
(45) Date of Patent: *Apr. 9, 2002

(54) METHOD OF MAKING A MULTI-COLORED COMPOSITE FOIL OF THERMOPLASTIC SYNTHETIC MATERIAL

(75) Inventors: Eberhard Rost, Garbsen; Ulrich Breuksch, Lindwedel; Roland Wolff, Seelze, all of (DE)

(73) Assignee: Benecke-Kaliko AG, Hannover (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,232

(22) Filed: Aug. 19, 1998

(30) Foreign Application Priority Data

Aug. 20, 1997 (DE) .......................... 197 36 194

(51) Int. Cl.⁷ .......................... B29C 47/02; B29C 47/06
(52) U.S. Cl. .............................. 156/244.25; 156/244.1; 156/293
(58) Field of Search .................... 156/244.25, 244.11, 156/244.12; 264/173.18, 177.17, 177.2

(56) References Cited

U.S. PATENT DOCUMENTS

| | | | | |
|---|---|---|---|---|
| 2,985,556 A | * | 5/1961 | Rowland | 264/173.18 |
| 3,458,386 A | * | 7/1969 | Shanok et al. | 156/244.11 |
| 3,565,737 A | | 2/1971 | Lefevre et al. | |
| 3,715,420 A | | 2/1973 | Kiyono et al. | |
| 3,799,718 A | | 3/1974 | Kiyono et al. | |
| 4,318,764 A | * | 3/1982 | VanManen | 156/244.11 |
| 4,923,551 A | * | 5/1990 | Wagers | 156/244.25 |
| 5,171,499 A | | 12/1992 | Cehelnik et al. | |
| 5,194,209 A | | 3/1993 | Schwaegerle | |
| 5,500,173 A | * | 3/1996 | Dugan | 264/173.18 |
| 5,639,408 A | * | 6/1997 | King | 264/177.17 |
| 5,662,851 A | * | 9/1997 | Yada | 264/173.18 |
| 5,811,046 A | * | 9/1998 | Dous | 264/173.18 |
| 5,858,404 A | | 1/1999 | Dous et al. | |

FOREIGN PATENT DOCUMENTS

| | | |
|---|---|---|
| DE | 2 035 578 | 2/1971 |
| DE | 25 50 553 A1 | 5/1977 |
| DE | 195 30 757 A1 | 2/1997 |
| EP | 0759351 A1 | 7/1996 |
| FR | 1 395 995 | 4/1964 |
| FR | 2 737 435 | 2/1997 |
| GB | 2 275 017 A | 8/1994 |
| GB | 1124254 | 8/1998 |
| JP | 59048137 | 3/1984 |

\* cited by examiner

*Primary Examiner*—Jeff H. Aftergut
*Assistant Examiner*—Barbara J. Mausser
(74) *Attorney, Agent, or Firm*—Fay, Sharpe, Fagan, Minnich & McKee, LLP

(57) ABSTRACT

The invention concerns a multi-colored composite foil (14) of thermoplastic synthetic material and a method and a device for its manufacture. The device according to the invention comprises a first extruder device (20) with a first forming tool (22), whereby the extruder device produces a first plastified synthetic material melt and extrudes same by the first forming tool in order to manufacture a carrier foil or carrier layer (10) with a first color (28) and with a depression. The device can, furthermore, comprise at least one second extruder device (24) with a second forming tool, whereby the second extruder device produces a plastified synthetic material melt and extrudes same by means of the forming tool in order to produce a top foil or top layer (12), which has a second color and which fits, surface-flush, into the depression of the carrier layer or carrier foil. The device according to the invention has, in addition, a calender (32) which joins the carrier foil, surface-flush, with the top foil fitted into the depression of the carrier foil under the influence of pressure and heat and which flattens out the produced surface.

9 Claims, 3 Drawing Sheets

METHOD OF MAKING A MULTI-COLORED COMPOSITE FOIL OF THERMOPLASTIC SYNTHETIC MATERIAL

The present invention concerns a multicolored, specifically a two-colored foil of thermoplastic synthetic material and a method and/or a device for the manufacture of the multicolored plastic foil.

Two-colored plastic foils are employed for example in motor vehicle technology as linings and surfaces for dashboards, interior roof linings or interior door panellings.

A two-colored dashboard foil or armature board foil of this type is described in DE 195 30 757 A1. The known foil consists of a sub-foil and at least two top foils, which have different colors and which are placed next to each other onto the plane sub-layer in order to form a two-color composite foil. The known dashboard foil is manufactured by co-extrusion of multiple extrusion of sub-layers and the two top layers, whereby a separate extruder is used for each of the layers. The plastified synthetic melts produced by the individual extruders are passed to an adapter block, which initially forms the individual layers separately, then joins same and finally discharges the combined layers via a sheet orifice. Consequently, in order to manufacture the known two- or multicolored plastic foil, at least three extruders are needed, which must be charged and controlled simultaneously. Moreover, in manufacturing the known foil, the reject rate is increased due to the great number of adjacent surfaces, for example for a two-colored foil, three adjacent surfaces between the different layers, where, for example, objectionable air-or gas bubbles can be occluded during the joining of layers, as well as other border area problems, which may occur for example based on minor differences in the properties of the synthetic materials employed for the individual layers.

It is the object of the present invention to provide a simple method for the manufacture of a two- or multicolored composite foil of thermoplastic synthetic material, with which it is possible to overcome the cited drawbacks of the state of the art. Furthermore, it is the object of the present invention to make available a device for implementation of the method. Another object of the invention lies in making available a two- or multicolored composite foil of thermoplastic synthetic material, which is easy to process further.

These objects are solved by the method according to claim 1, and also by the device according to claim 7 and the composite foil according to claim 19.

The method according to the invention in accordance with claim 1 for the manufacture of the multicolored, specifically two-colored, composite foil of the present invention comprises accordingly the manufacture of a carrier foil or carrier layer by extrusion of a thermoplastic synthetic material, whereby the carrier foil or the carrier layer has a least one depression or recess or indentation in its thickness profile.

The term depression in this context specifically means any deviation in the thickness profile of the carrier layer from its rectangular form. The depression can for example have the form of a rectangularly shaped recess or a rectangular cut-out from a rectangularly shaped contour. The cross-sectional contour passes at one top side of the carrier layer in form of a step into the depressed area of the recess. The depression can occupy one single closed area of the carrier foil, it can, however, also involve several, from each other separated, areas of the carrier foil.

Concurrently with the manufacture of the carrier layer, in the method according to the invention, at least one top foil or top layer is conducted, whereby the top layer or the top layers fits (fit) into the appropriate depression of the carrier layer and is/are positioned in such manner in the depression of the carrier layer or carrier foil, so that the thus obtained multicolored plastic foil of the invention is formed with flush surface, whereby the carrier layer has a different color or is dyed differently than the top layer or the top layers. It is also possible to guide several top layers or top foils from differently dyed synthetic materials.

The plastic foil or deep-drawn foil according to the invention produced with this method according to claim 19 has one top side and consists of a composite of one carrier layer or carrier foil and at least one top layer or top foil, whereby the top layer or top foil is fitted into a depression of the carrier layer or carrier foil and is flush with the surface of the carrier layer or carrier foil and the carrier layer or carrier foil and the top layer or top foil each form part of the top side of the foil and each have a different color shade.

The foil according to the invention preferably has a rectangular thickness profile, whereby the depression of the carrier foil or carrier layer is a rectangular recess and extends into the top foil or top layer arranged in the rectangular recess at the top side of the foil.

If one examines the top side or the upper surface of the finished foil of the invention, one sees, for example, with a two-colored foil, an area with a first color and an area with a second color. The first visible surface area belongs for example to the carrier layer and the second visible surface area is then a component of the top foil or top layer. The first color can have a dark, black or gray color shade while the second color can have a light or white shade of color.

Since the carrier layer or the carrier foil itself is visible with employment of the foil according to the invention, at least one extruder is saved by means of the present invention vis-a-vis the state of the art, as a result of which a most cost efficient and easier controllable method is obtained for producing the multicolored foil according to the invention. In addition, less waste is generated in the production of the foil according to the invention, since, for example, with a two-colored foil, which, according to the invention is composed of one carrier layer and only one top layer, there exists only one border area, compared with the above explained state of the art, which is technologically easier to control, as a rule, and contributes to reduced faulty production at the border areas, and thus to lower reject material.

Finally, it should be pointed out that, overall, the foil according to the invention has improved stability when applied or further processed, inasmuch as due to the minimal layer- and border area number, defects in the border area are also minimal.

The synthetic material from which the carrier layer or the carrier foil is made and the plastic material or plastic materials from which the top layer or the top layers is/are made preferable have approximately the same viscosity at the same temperatures. Because of said property, a stable compound of carrier layer and at least one top layer or top foil is obtained during manufacture of the foil according to the invention.

Suitable thermoplastic synthetic material for the method according to the invention are, among others: polyolefins, vinylpolymers, polyamides, polyesters, polyacetates, polycarbonates and, partially, polyurethanes as well. Specifically preferred are polyolefins.

The polychromacity of the plastic foil according to the invention can be obtained by adding suitable different color pigmentation or dye to the plastic melts of the carrier layer or the carrier foil and the top layer or top layers.

The device according to the invention for the manufacture of the foil according to the invention having two or more colors according to claim 7 comprises one extruder device for producing a plastified synthetic material melt, said extruder device being equipped with a first molding tool for molding a carrier foil or a carrier layer of a first color while forming at least one indentation.

It can have, in addition, at least one other extruder device for producing at least one additional plastified synthetic material melt, whereby at least the one additional extruder device is equipped with one additional molding tool for molding a respective top foil or top layer with a color different from the named first color, whereby at least the one additional molding tool is designed in such manner that the surface of the therefrom formed top layer or top foil respectively fits surface-flush into the corresponding depression of the carrier layer or carrier foil.

Furthermore, the device has a calender for surface-flush joining of the carrier foil or carrier layer with at least the one top layer or top foil fitted into the corresponding depression of the carrier layer or carrier foil and for smoothing out the produced surface.

The first molding tool preferably has a slot-like orifice, into which projects a protrusion, whose cross-section extending cross-wise vis-a-vis the flow direction of the plastic melt corresponds to the cross section of the depression of the to be produced carrier foil.

Said protrusion may be arranged adjustably in the first molding tool of the device according to the invention in order to be able to change or adjust the shape or the dimensions of the depression in the carrier foil or the carrier layer.

The protrusion can have the shape of a relatively elongated lip or lamella, which extends over a portion of the slot-like cross-section of the orifice of the first molding tool. It is possible, hereby, to thus produce a depression or recess in the carrier layer which is rectangular in cross-section.

The lip may be adjustable in height and/or in length, in order to be able to determine or vary the thickness or the size of the rectangular recess or the width of the recess and thus the width of the area of the foil according to the invention with the second color.

The orifice of the second molding tool can have a cross section extending cross-wise vis-a-vis the flow direction of the plastic melt, which corresponds approximately to the protrusion or the lip.

The interior cross-section of the orifice of the second and/or each additional molding tool is adjustable or variable in accordance with the selected adjustment of the projection or the lip of the first molding tool, so that an inside cross-section of the orifice of the second or each additional molding tool can be adjusted in accordance with the modified cross-section of the depression of the carrier foil.

According to a further beneficial specific embodiment, at least one device is provided for preheating at least one of the foils or layers before the calender. The temperature of said heating device is selected conditional upon the properties of the to be heated foil, such as for example thickness and type of the thermoplastic synthetic material. The preheating preferably takes place by means of an IR radiant [heating] field.

Further beneficial refinements of the invention are apparent from the sub claims 2 to 6, 8 to 17 and 20.

Additional benefits, beneficial refinements and application possibilities of the present invention are apparent from the description which follows with regard to specific embodiments of the invention in connection with the enclosed drawings.

Figure 1:
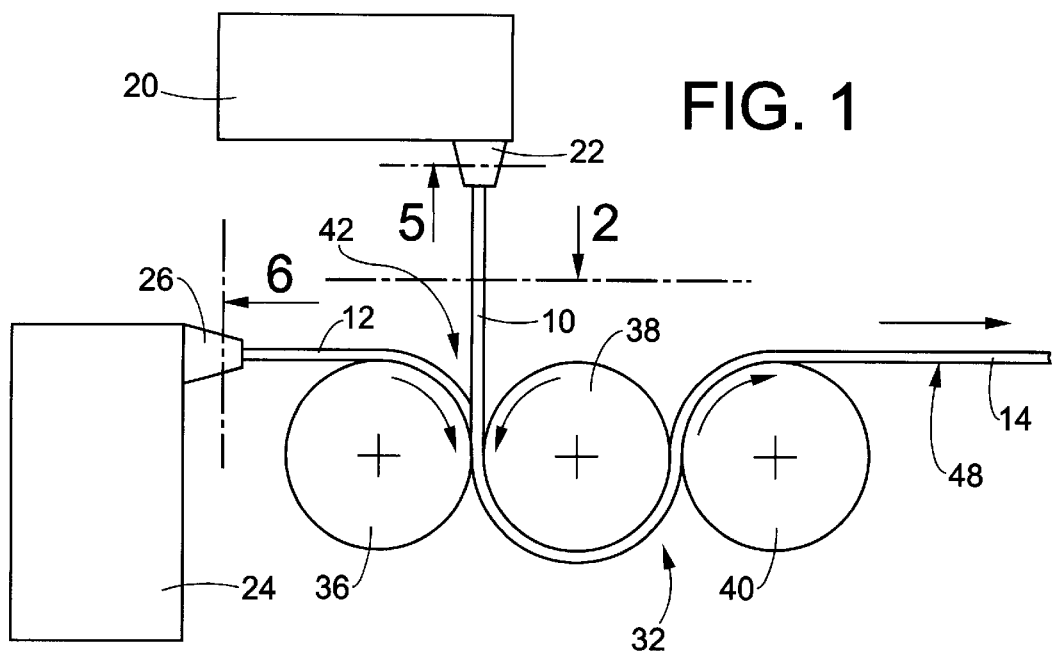
FIG. 1 shows a schematic lateral view of a first specific embodiment of the device according to the invention, seen in the direction of the arrow I of FIG. 2.
Figure 2:
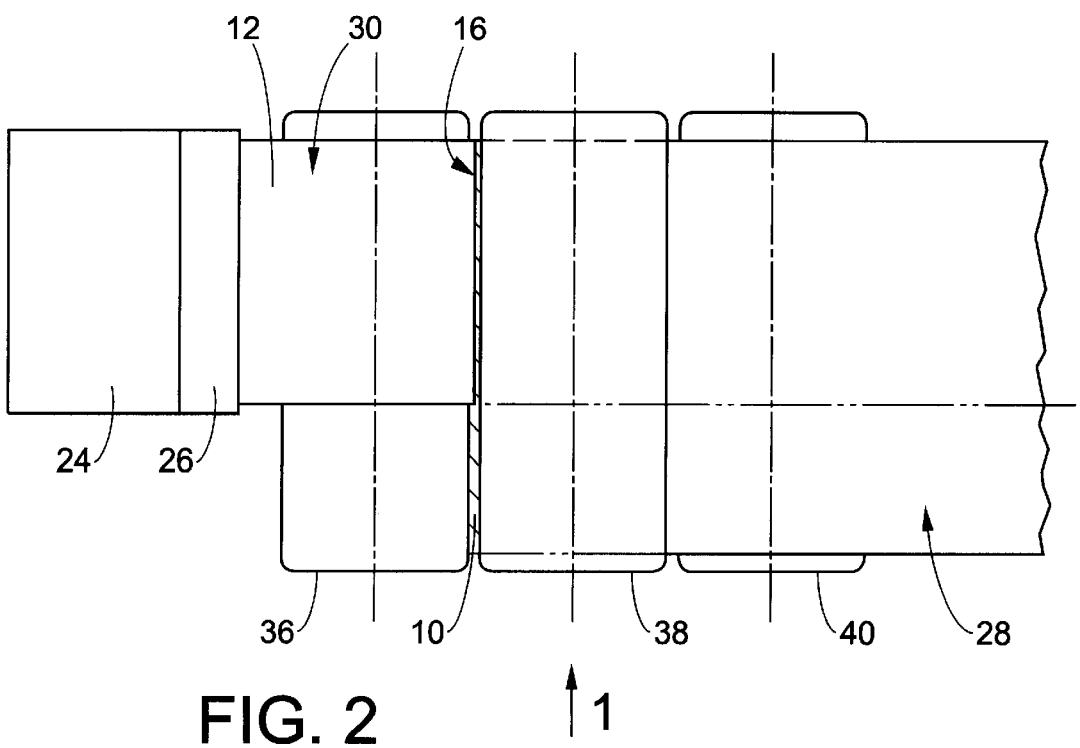
FIG. 2 shows a top view of FIG. 1 in the direction of the arrow II.

In FIGS. 1 and 2, a first specific embodiment of the device according to the invention is shown schematically, which basically comprises a first extruder device 20 or an extruder with a first molding tool 22, a second extruder device 24 with a second molding tool 26, and a calender. The first specific embodiment of the device according to the invention is designed for manufacture of a foil 14 of plastic, which is made up of a carrier foil or carrier layer 10 and a top layer or top foil 12. Instead of the second extrusion device 24 there may, however, also be provided an inventory of an already finished top layer or top foil 12.

The first extrusion device 20 has the usual construction of an extrusion implement and comprises, among others, a feeding screw (not shown) which is charged, at the input side, with synthetic granulate, which is being plastified and homogenized into a viscous molding mass during transport via the screw, under addition of heat and by means of pressure developed in the screw. The molding mass of the plastic melt is extruded by the extruder 20 via a first molding tool with integrated discharge orifice or sheet orifice (not shown) as carrier foil or carrier layer 10. The carrier foil 10 has a first color 28 from appropriate addition of dye or color pigmentation, which may have, for example, a dark, black or gray color shade.

The second extruder device 24 is constructed identically or similar to the first extruder device 20 and extrudes a synthetic melt or molding mass by means of a second molding tool 26 with exit orifice (not shown) as top foil or top layer, which has a second color 30 with a different shade from the first color 28, for example a light or white color shade.

Figure 5:
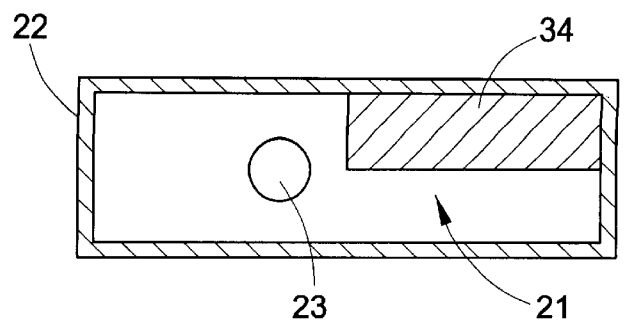
FIG. 5 is a schematic cross-section of the first molding tool of the device according to the invention in accordance with FIG. 1, seen in the direction of arrow V of FIG. 1 (rotated by 90 degrees in clock-wise direction vis-a-vis the position in FIG. 1)

The first molding tool 22 is arranged at the first extruder device 20 and is shown in cross-section in FIG. 5 (compare V in FIG. 1). The first molding tool 22 has a molding chamber 21, into which enters the synthetic melt via a channel 23, originating from the extruder device 20, and a generally rectangular slot-like inside cross-section. Into chamber 21 projects a lip 34 as protrusion, which has a right-angled cross-section and serves for forming a right-angled recess as depression 16 in the carrier foil 10 formed by the first molding tool 22. The chamber 21 of the molding tool 22 verges at the discharge side in the direction of the flow of the synthetic melt into a discharge orifice (not shown).

Figure 6:
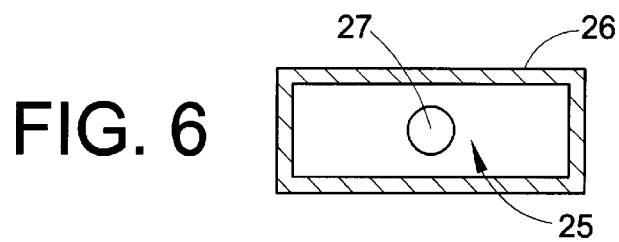
FIG. 6 shows a schematic cross-section of the second molding tools of the device according to the invention in accordance with FIG. 1, seen in the direction of arrow VI of FIG. 1.

The second molding tool 26 is arranged at the second extruder device 24 and is shown in cross-section in FIG. 6. It has a molding chamber 25 which has a right-angled inside cross-section. The chamber 25 of the second molding tool 26 can be supplied on the inlet side via a channel 27 with the synthetic melt or molding mass from extruder 24. Chamber 25 passes on the exit side into the extrusion opening of the discharge orifice (not shown) of the molding tool 26. The right-angled inside cross-section of chamber 25 of the second molding tool 26 is adapted to or congruent with the right-angled cross-section of the lip 34 protruding into the chamber 21 of the first molding tool 22. The second molding tool 26 produces the top foil or top layer with rectangular, slot-like thickness profile.

The calender 32 of the first specific embodiment of the device according to the invention comprises three next to each other arranged rotating cylinders 36, 38 and 40. The rotational direction of the cylinders is indicated with corresponding arrows in FIG. 1.

The first cylinder 36 rotates in clock-wise direction, whereas its adjacent second cylinder 38 rotates in counter-clockwise direction. Between the first cylinder 36 and the second cylinder 38 there is a feed slot 42, in whose region the first cylinder 36 and the second cylinder 38 collect and pull in the carrier layer 10 and the top layer 12. As indicated in FIG. 1, the first molding tool 22 with its exit opening is arranged above the feed slot 42 in such manner that the carrier layer 10 extruded by the extruder device 20 and the molding tool 22, enters the feed slot 42 vertically or perpendicular, coming from the top. The top layer 12, extruded by the second extruder device 24 and the second molding tool 26 extends, on the other hand, initially in a horizontal plane, as is shown in FIG. 1, and is then transported by the first cylinder 36 and, positioned on its cylinder circumference, is conducted to the feed slot 42. The second molding tool 26 is arranged in such manner that the top layer, correctly positioned or adjusted in position relative to the carrier layer 10, enters the feed slot 42 between the first cylinder 36 and the second cylinder 38, whereby the top layer 12 enters, exactly congruent, into the rectangular recess or depression 16 of the carrier layer 10.

The first cylinder 36 and the second cylinder 38 transport the joined carrier layer 10 and top layer 12 until the composite foil leaves again the calender 32 via the third cylinder 40, which rotates in clock-wise direction.

As a result of the temperatures prevailing in the calender, ranging between 40 to 90° C. and the pressure exercised by the cylinder, the foils are fused together or glued together to form a solid composite and, concurrently, the surface of the developing composite foil is being smoothed out.

The method according to the invention, which is executed with the first specific embodiment of the device in accordance with the invention according to FIGS. 1 and 2, thus starts with the manufacture of a carrier foil or carrier layer 10 which, in essence, has a rectangular slot-like thickness profile, in which a depression 16, here a rectangular recess, is formed along the entire longitudinal extension of the carrier layer 10, by the lip 34 of the molding tool 22.

Concurrently with the manufacture of the carrier layer 10, a top layer 12 is produced by means of extrusion and shaping, whose thickness profile is rectangular and slot-like.

The top layer 12 fits congruently into the depression 16 or the rectangular recess of the carrier layer 10.

The carrier layer 10 and the top layer 12 are then joined in a calender 32 by means of pressure and heat, so that a stable composite is formed from the carrier layer 10 and the top layer 12, which is issued from the calender 32 as composite foil 14 according to the invention. The joining or bonding of the carrier layer 10 and the top layer 12 is done in the area of the feed slot 42 of the calender 32, whereby the carrier layer 10 and also the top layer 12 are conducted from the geometric site of their manufacture or shaping in such manner to the feed slot 42, that the top layer 12 is fitted or inserted in proper position into the depression 16 or the rectangular recess of carrier layer 10.

As a result of the pressure exercised by the cylinders, the surface of the composite foil is, furthermore, smoothed out.

It is possible, to provide by way of at least one of the foils or layers of the extruder device to the calender a device for preheating the corresponding foil, in order to prepare same in suitable manner for the subsequent process of joining or bonding.

Figure 3:
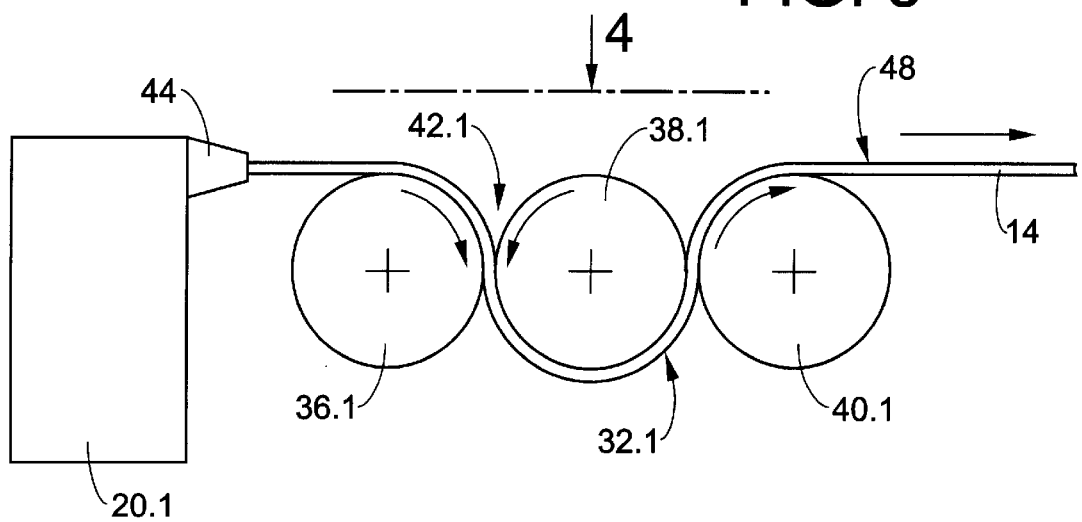
FIG. 3 shows a schematic lateral view of a second specific embodiment of the device according to the invention, seen in the direction of arrow III of FIG. 4.
Figure 4:
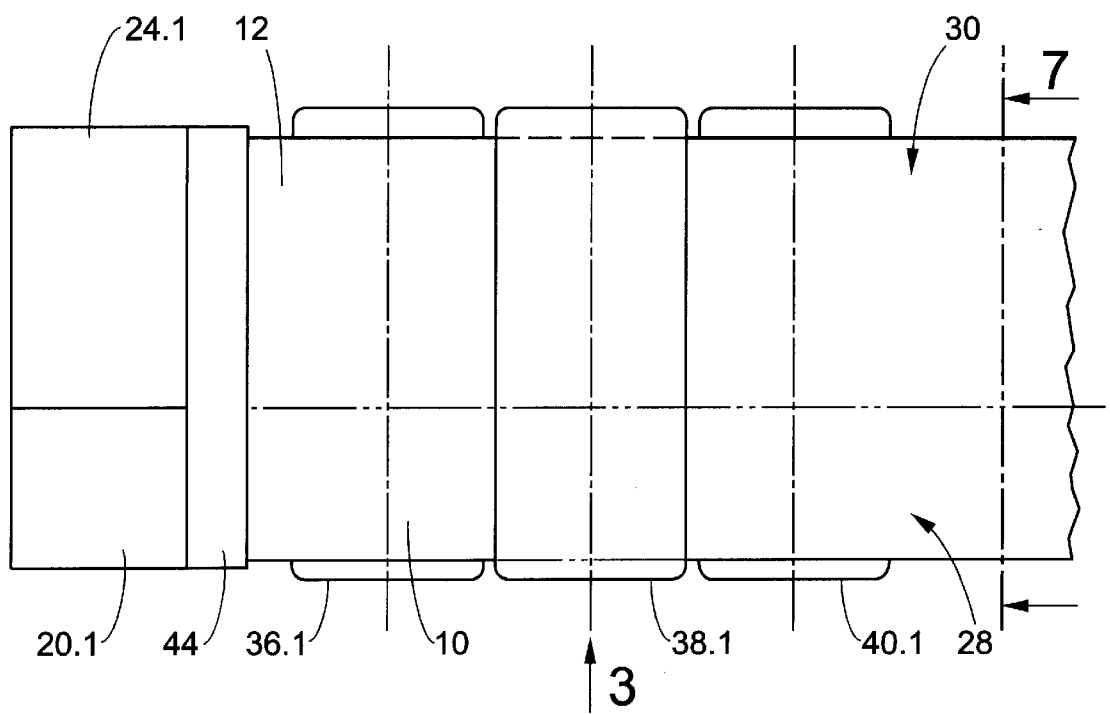
FIG. 4 is a top view in the direction of arrow IV of FIG. 3.

FIGS. 3 and 4 show a second specific embodiment of the device according to the invention, schematically. The second specific embodiment comprises a first extruder device 20.1 and a second extruder device 24.1, which have the same construction and the same function as the first and second extruder device 20 and 24 of the first specific embodiment of FIGS. 1 and 2.

At the output side, the extruder devices 20.1 and 24.1 are connected, flow-wise, with a forming block 44, which is arranged at the two extruder devices 20.1 and 24.1. The forming block 44 comprises in integrated fashion the first molding tool 22, according to FIG. 5 of the first specific embodiment and also the second molding tool 26 of the first specific embodiment of the device according to the invention. Integrated into forming block 44 is, however, the second molding tool 26 of FIG. 6 instead of the lip 34 of the first molding tool 22 of FIG. 5 (not shown) in order to produce and join in the forming block 44 both the carrier layer 10 with rectangular recess, as well as the top layer 12 with rectangular, slot-lite cross-section 12. From an outlet orifice (not shown) of forming block 44 then exits a composite of carrier layer 10 and top layer 12.

As is evident from FIG. 3, said composite of carrier layer 10 and top layer 12, coming from forming block 44 is conducted to calender 32.1, which, in turn, has three cylinders 36.1, 38.1 and 40.1, arranged next to each other, whose axes are parallel to each other and are positioned in a common horizontal plane. The composite foil exiting from the forming block reaches the first cylinder 36.1 in horizontal orientation and is then introduced on part of the cylinder circumference of the first cylinder 36.1 into a feed slot 42.1. The first cylinder 36.1 and the second cylinder 38.1 seize the composite and convey it further into the gap between the second cylinder 38.1 and the third cylinder 40.1 which issue the foils as composite foil 14 after joining or bonding and smoothing of the developing surface.

The produced foil 14 is, in turn, two-colored. It shows on its top side 48 a first color 28, with which the carrier layer has been dyed, and a second color 30, with which the top layer 12 has been dyed.

With the alternative mode of the method according to the invention, which is executed with the second specific embodiment of the device in accordance with the invention according to FIGS. 3 and 4, the carrier layer 10 and the top layer 12, in contrast to the first specific embodiment according to FIGS. 1 and 2, are not just joined in the feed slot 42.1 of the calender 32.1 of the second specific embodiment, but are joined immediately following the shaping of the carrier layer 10 and the top layer 12, in the integrated forming block 44, so as to leave already as a composite the forming block 44. Said composite of carrier layer 10 and top layer 12 is then pulled into the feed slot 42.1 of the calender 32.1 and is further processed, so that a plastic foil 14 is obtained after smoothing, which is identical to the plastic foil produced with the first specific embodiment of the device in accordance with the invention, according to FIGS. 1 and 2.

Figure 7:
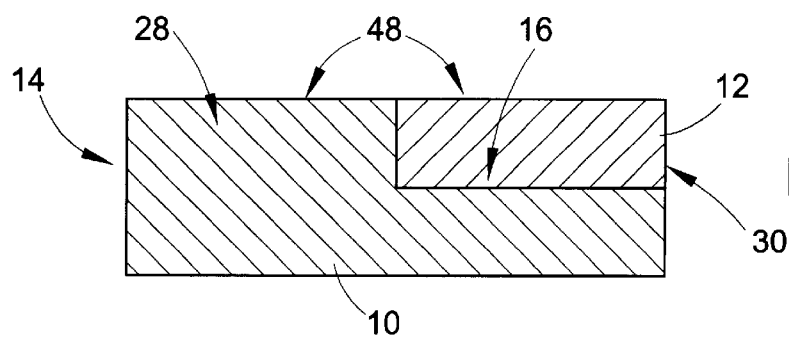
FIG. 7 shows a schematic cross-section of the first specific embodiment of the foil according to the invention, produced with the device of FIGS. 1 and 2 or the device of FIGS. 3 and 4 seen in the direction of arrow VII of FIG. 4.

The construction of the foil 14 of thermoplastic material produced with the first and second specific embodiment of the device according to the invention is shown schematically in cross-section in FIG. 7. It is clearly apparent from FIG. 7 that the carrier layer 10 of foil 14 up to the top side 48 of foil 14 and also the top layer 12 which is fitted into the depression 16 or into the rectangular recess of carrier layer 10, reaches up to the top side 48 of foil 14. The top side 12 and the carrier layer 10 have a flush surface at the top side 48 of foil 14. Since the carrier layer 10 has a first color 28 and the top layer 12 has a second color 30, which are different from each other, for the person looking at them, the top side 48 of foil 14 has a two-colored appearance.

Figure 8:
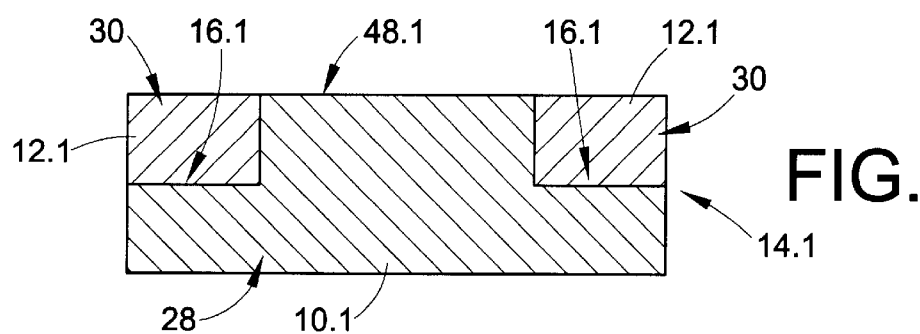
FIG. 8 shows a schematic cross-sectional view of a second specific embodiment of the foil according to the invention with two colors, whereby the carrier layer is visible as a strip between the top layer.

FIG. 8 shows a second exemplary specific embodiment of the plastic foil according to the invention. Foil 14.1 of the second specific embodiment comprises again one carrier foil 10.1 with a color 28, and a top layer 12.1 which consists of two strips extending parallel to each other, separated from each other at the top side 48.1 of foil 14.1.

The strips of top layer 12.1 are arranged or fitted into corresponding rectangular recesses or depressions 16.1. With foil 14.1 the carrier layer also reaches up to the top side of foil 14.1. The forming tools employed for shaping the carrier layer 10.1 and the top layer 12.1 are designed accordingly for producing the foil 14.1.

Figure 9:
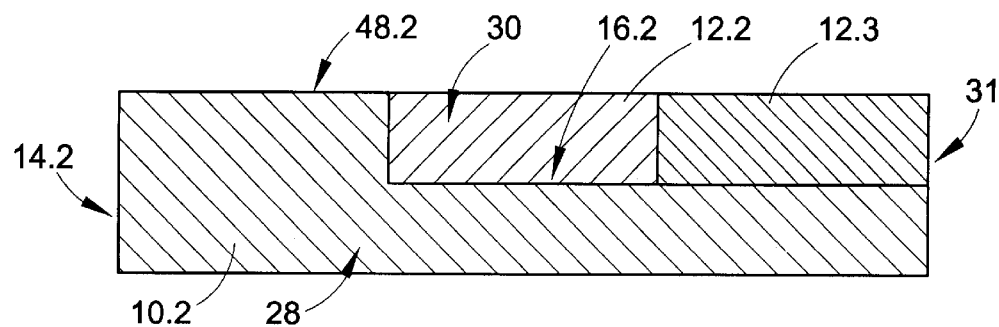
FIG. 9 shows a schematic cross-sectional view of a third specific embodiment of the foil according to the invention with three colors, which are visible as three adjacent paths or strips.

FIG. 9 shows a third exemplary specific embodiment of the foil according to the invention. The foil 14.2 again comprises a carrier layer 10.2, which has a depression 16.2 or a rectangular recess. Into said depression 16.2 are fitted or inserted next to each other a first rectangular top layer 12.2 and a second rectangular top layer 12.3. The carrier layer has the color 28, the first top layer 12.2 has the color 30 and the second top layer 12.3 has the color 31. Colors 28, 30, 31 are different from each other. The carrier layer 10.2 reaches again up to the upper side 48.2 of foil 14.2, whereby the carrier layer 10.2, the first top layer 12.2 and the second top layer 12.3 have a flush surface at the top side 48.2.

Foil 14.2 thus has a 3-color aspect at the top side 48.2.

We claim:

1. A method for manufacturing a multi-colored composite foil of thermoplastic synthetic material comprising:
    manufacturing a carrier layer of a first color by extruding a thermoplastic synthetic material while forming at least one depression in the thickness profile of the carrier layer;
    joining at least one top layer whose color is different from the first color of the carrier layer after the extrusion of the carrier layer, whereby the at least one top layer is formed in such a manner that it fits surface-flush into the depression of the carrier layer, inserting the at least one top layer into the corresponding depression of the carrier layer and bonding of the layers under the influence of heat and pressure with concurrent smoothing of a developing surface so that said multi-colored composite foil is formed with flush surface to form a composite foil, said top layer forming at least one edge of the foil.

2. The method of claim 1 wherein the carrier layer is formed with a rectangular thickness profile and with a depression in the shape of a recess with rectangular cross-section and the top layer is formed with a thickness profile having the shape and size of the rectangular recess of the carrier layer.

3. The method of claim 1, wherein the carrier layer and the at least one top layer are produced of thermoplastic synthetic materials whose viscosities approximately correspond to each other at identical temperatures.

4. The method of claim 1, wherein at least one of the carrier or top layers is preheated prior to the step of joining or bonding.

5. The method of claim 1, wherein an additional smoothing step of the surface of the composite foil is performed.

6. A method for manufacturing a multi-colored composite foil of thermoplastic synthetic material comprising:
    manufacturing a carrier layer of a first color by extruding a thermoplastic synthetic material while forming at least one depression adjacent an edge in the thickness profile of the carrier layer;
    joining at least one top layer whose color is different from the first color of the carrier layer after the extrusion of the carrier layer, whereby the at least one top layer is formed in such a manner that it fits surface-flush into the depression of the carrier layer, inserting the at least one top layer into the corresponding depression of the carrier layer and bonding of the layers under the influence of heat and pressure with concurrent smoothing of a developing surface so that said multi-colored composite foil is formed with flush surface to form a composite foil.

7. A method for manufacturing a multi-colored composite foil of thermoplastic synthetic material comprising:
    manufacturing a carrier layer of a first color by extruding a thermoplastic synthetic material while forming at least two depressions in the thickness profile of the carrier layer;
    joining at least one top layer whose color is different from the first color of the carrier layer after the extrusion of the carrier layer, whereby the at least one top layer is formed in such a manner that it fits surface-flush into the depressions of the carrier layer, inserting the at least one top layer into the corresponding depressions of the carrier layer and bonding of the layers under the influence of heat and pressure with concurrent smoothing of a developing surface so that said multi-colored composite foil is formed with flush surface to form a composite foil; said at least one top layer forming an edge of the foil.

8. The method of claim 7 wherein said multi-colored composite foil includes at least three colors.

9. A method for manufacturing a multi-colored composite foil of thermoplastic synthetic material comprising:
    manufacturing a carrier layer having a width (a) of a first color by extruding a thermoplastic synthetic material while forming at least one depression in the thickness profile of the carrier layer;

joining at least one top layer having a width (b) whose color is different from the first color of the carrier layer after the extrusion of the carrier layer, wherein said width (b) is <½ width (a) whereby the at least one top layer is formed in such a manner that it fits surface-flush into the depression of the carrier layer, inserting the at least one top layer into the corresponding depression of the carrier layer and bonding of the layers under the influence of heat and pressure with concurrent smoothing of a developing surface so that said multi-colored composite foil is formed with a substantially flush surface.

* * * * *